United States Patent
Hsu et al.

(10) Patent No.: US 7,175,134 B2
(45) Date of Patent: Feb. 13, 2007

(54) HYDRAULIC DAMPER FOR SHIMMY OF AIRCRAFT LANDING GEAR

(75) Inventors: Dayu Hsu, Yorba Linda, CA (US); William David Cook, Sherman Oaks, CA (US)

(73) Assignee: Eaton Corporation, Cleveland, OH (US)

( * ) Notice: Subject to any disclaimer, the term of this patent is extended or adjusted under 35 U.S.C. 154(b) by 184 days.

(21) Appl. No.: 10/994,930

(22) Filed: Nov. 22, 2004

(65) Prior Publication Data

US 2006/0144993 A1 Jul. 6, 2006

(51) Int. Cl.
*B64C 25/00* (2006.01)
(52) U.S. Cl. ............... 244/104 FP; 244/50; 244/104 R
(58) Field of Classification Search ......... 244/104 FD, 244/104 F
See application file for complete search history.

(56) References Cited

U.S. PATENT DOCUMENTS

| | | | | | |
|---|---|---|---|---|---|
| 2,371,699 | A | * | 3/1945 | Martin | 244/102 A |
| 2,559,451 | A | * | 7/1951 | McBrearty | 244/102 R |
| 2,849,199 | A | * | 8/1958 | Lucien | 244/104 R |
| 2,866,609 | A | * | 12/1958 | Stout | 244/50 |

* cited by examiner

*Primary Examiner*—Stephen M. Johnson
*Assistant Examiner*—Benjamin P. Lee
(74) *Attorney, Agent, or Firm*—Marvin L. Union

(57) ABSTRACT

A hydraulic system for steering an aircraft while taxiing selectively applies pressurized fluid to different ports of a hydraulic motor to turn a landing gear wheel either left or right. Shimmy of the landing gear attached to the wheel is dampened by a device that is coupled across the hydraulic lines that are connected to the motor. That device has a piston in a bore with one hydraulic line connected via an orifice to a first chamber on one side of the piston and the other hydraulic line connected via a different orifice to a second chamber on the other side of the piston. The piston stroke is limited to control the effective oscillation damping amplitude. The shimmy produces an oscillating pressure differential in the two hydraulic lines which is dampened by the device.

17 Claims, 1 Drawing Sheet

HYDRAULIC DAMPER FOR SHIMMY OF AIRCRAFT LANDING GEAR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic steering systems for aircraft landing gear wheels, and more particularly to mechanisms for damping vibration in such steering systems.

2. Description of the Related Art

Landing gear assemblies that are retractable into the fuselage of an aircraft include an actuator for raising and lowering the landing gear with respect to the fuselage and another actuator for turning the nose landing gear to steer the aircraft during taxiing. One common type of steering actuator utilizes a hydraulic motor connected by a gear box to a vertical strut on which the aircraft wheels are mounted. By applying pressurized fluid to different ports of the hydraulic motor, the strut can be rotated in either of two directions about a vertical axis to turn the landing gear wheels left or right. A servo valve assembly controls the flow of hydraulic fluid through the motor between a supply line from a pump and a tank return line leading back to a reservoir for the hydraulic system. Different positions of the valve assembly determine into which motor port the pressurized fluid is directed and thus the direction of the turning motion. The valve assembly is operated in response to manipulation of an steering control mechanism by the pilot.

Some aircraft nose wheel configurations are dynamically unstable which may result in the wheel oscillating about its caster axis, commonly known as shimmy. A damping mechanism is frequently provided to reduce that shimmy when power is not being applied to the steering motor. In this "free caster" mode, the ports of the hydraulic motor are disconnected from the supply and return lines and a damping orifice is connected between the ports. Thus, the flow of fluid between the two ports is restricted thereby damping motion of the nose wheel about the caster axis.

However, when the hydraulic motor is being powered, a shimmy damping orifice provides a path in parallel with the motor through which fluid flows from the supply line directly to the tank return line. The damping orifice thus provides a leakage path for the pressurized fluid to by-pass the hydraulic motor, thereby resulting in an energy loss.

As a consequence, it is desirable to provide a shimmy damping mechanism that does not result in an appreciable energy loss.

SUMMARY OF THE INVENTION

A hydraulic system is provided for steering a landing gear wheel of an aircraft while taxiing. The hydraulic system includes a supply line that receives pressurized fluid from a source, such as a pump for example, and a return line through which the fluid flows to a reservoir of the system. A hydraulic motor is operatively connected to turn the landing gear wheel and incorporates first and second ports. A direction control valve has a first position in which fluid from the supply line is conveyed to the first port of the motor and fluid from the second port is conveyed into the return line, a second position in which fluid from the supply line is conveyed to the second port and fluid from the first port is conveyed to the return line, and an third position in which the supply line and the return line are disconnected from the first port and the second port.

A damper includes a bore with a piston slidably received therein thereby defining a first chamber and a second chamber on opposite sides of the piston. A first orifice couples the first chamber to the first port of the motor, and a second orifice couples the second chamber to the motor's second port.

Shimmy forces occurring in the aircraft landing gear during taxiing are transmitted to and produce rotational motion of the motor, thereby causing the motor to act as a pump. This action creates a pressure differential in the hydraulic conduits connected to the motor. That pressure differential is be applied across the damper which causes the piston to move and thereby damping the effects of the shimmy. Because fluid cannot flow through the damper between the hydraulic conduits when the piston is bottomed at either end, no significant energy loss occurs with this damping mechanism in response to a noticeable commanded motion. The energy dissipation is limited to small amplitude oscillation by setting the piston stroke limit.

A preferred embodiment of the hydraulic system has a first intermediate conduit and a second intermediate conduit. In the first position of the direction control valve, the first intermediate conduit is connected to the supply line and the second intermediate conduit is coupled to the return line, and in the second position the first intermediate conduit is connected to the return line and the second intermediate conduit is coupled to the supply line. The first and second intermediate conduits are disconnected from the supply line and the return line in the third position of the direction control valve. A shutoff valve has one position in which the first intermediate conduit is connected to the first port of the motor and the second intermediate conduit is connected to the second port of the motor, and another position in which first and second intermediate conduits are disconnected from the first and the second ports and a damping orifice is connected between the first and second ports. In this version of the system, the first orifice of the damper is connected between the first intermediate conduit and the first chamber, and the second orifice is connected between the second intermediate conduit and the second chamber.

In this preferred embodiment, the shut off valve connects the damping orifice across the hydraulic motor when the landing gear wheel is not being steered. When steering is active, the shut off valve couples the motor to the first and second intermediate conduits. In this latter state the damper serves to reduce the effects of shimmy.

DETAILED DESCRIPTION OF THE INVENTION

Figure 1:
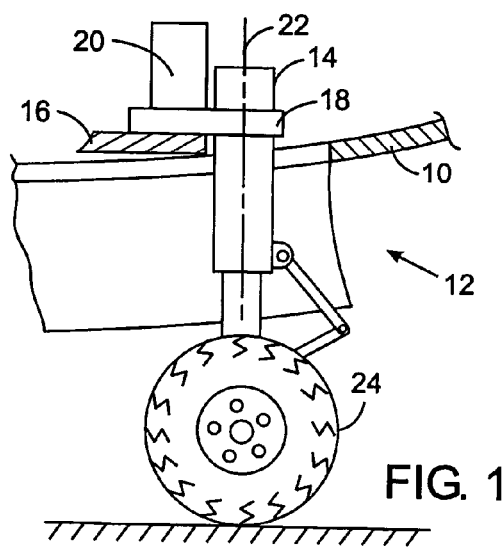
FIG. 1 depicts a nose landing gear of an aircraft.

With initial reference to FIG. 1, an aircraft 10 has a nose landing gear 12 that comprises a vertical strut 14 connected to the aircraft frame 16 by a gear box 18 that is driven by a hydraulic motor 20. In other aircraft, the gear box couples the vertical strut to a tube that is concentric to the strut. When the hydraulic motor is powered, the strut 14 is rotated about a vertical axis 22, thereby turning the landing gear wheel 24 left or right, depending upon the direction of rotation provided by the motor 20. As the wheel 24 travels along the ground when the aircraft is taxiing, vibrations can produce shimmying of the landing gear about the caster axis. Reference herein to the landing gear wheels turning refers to motion about the vertical axis 22 to steer the aircraft, as opposed to rotation of each the wheel about its axle. It should be understood that the aircraft will be turning when the landing gear wheel 24 is not pointing straight forward and will occur even though wheel is not being turned, i.e. the rotational angle with respect to the fuselage is constant.

Figure 2:
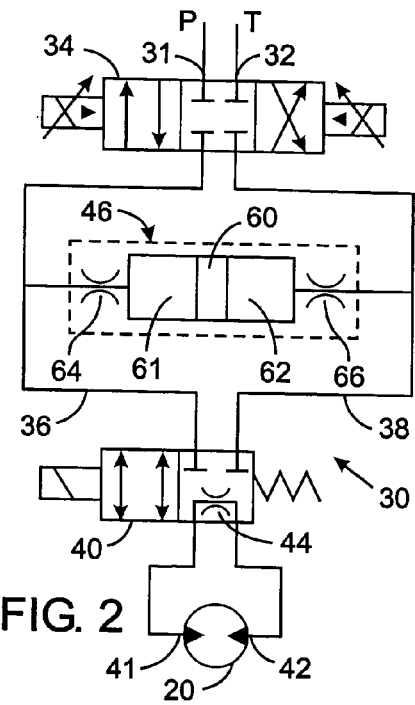
FIG. 2 is a schematic diagram of the hydraulic circuit for steering the nose landing gear, where the circuit is in a non-steering state.

FIG. 2 illustrates the hydraulic steering control system 30 of the aircraft. The motor 20 receives pressurized hydraulic fluid from a pump supply line 31 and after flowing through the motor the fluid travels into a tank return line 32. A flow control valve 34, which is operated bidirectionally by electric current, couples the pump and tank return lines 31 and 32 to a pair of intermediate conduits 36 and 38. Depending upon the position of the flow control valve 34, one of the intermediate conduits 36 or 38 is connected to the supply line 31 and the other intermediate conduit 38 or 36 is connected to the tank return line 32. Which intermediate conduit 36 or 38 receives the fluid from the supply line determines the rotational direction of the hydraulic motor 20 and thus whether the aircraft nose wheel 24 turns left or right. The three-position, flow control valve arrangement may be replaced by other valve arrangements, such as using four individually operated valves to connect the supply and tank return lines 31 and 32 to the two intermediate conduits 36 and 38.

The two intermediate conduits 36 and 38 are connected by a shutoff valve 40 to two ports 41 and 42 of the hydraulic motor 20. The shutoff valve 40 has an open position in which the intermediate conduits are coupled to the hydraulic motor ports so that fluid is able to flow in either direction there between. In a closed position of the shutoff valve 40, the intermediate conduits 36 and 38 are terminated and a power-off damping orifice 44 is connected between the two motor ports 41 and 42. An arrangement of two individually operated valves may be used to connect each intermediate conduit 36 and 38 to one of the motor ports 41 and 42 in place of the single shutoff valve arrangement.

Figure 3:
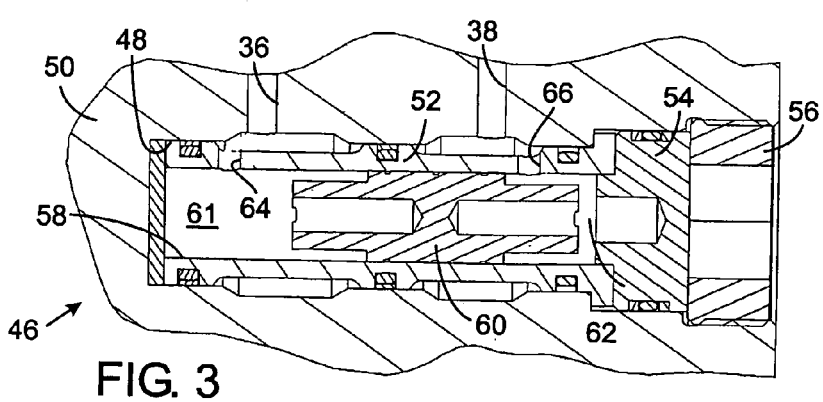
FIG. 3 is a cross-sectional view through a power-on damper in the circuit of FIG. 2.

A power-on damper 46 is connected between the two intermediate conduits 36 and 38. As shown in FIG. 3, the power-on damper 46 is located within an aperture 48 in a valve body 50 with the two intermediate conduits 36 and 38 communicating with that aperture. The power-on damper 46 comprises a sleeve 52 secured within the aperture 48 by an end disk 54 that is held against the sleeve by a retaining ring 56 threaded into an open end of the aperture. The sleeve 52 is tubular with an internal bore 58 in which a piston 60 is slidably received. First and second chambers 61 and 62 are defined within the bore 58 on opposite sides of the piston 60. A first orifice 64 provides a fluid path between the first intermediate conduit 36 and the first chamber 61, while a second orifice 66 creates a fluid path between the second intermediate conduit 38 and the second chamber 62. The piston 60 has surface areas of identical sizes exposed in each of the first and second chambers 61 and 62, so that the same pressure in each chamber will exert equal, but opposite forces on the piston. In the preferred embodiment of the power-on damper 46, the piston 60 slides freely within the bore 58 in response to only any difference in pressure between the first and second chamber 61 and 62. However, a springs may be provided in the two chambers 61 and 62 to center the piston 60 when the hydraulic motor 20 is deactivated.

Referring again to FIG. 2, when the landing gear wheel 24 is not turning, the flow control valve 34 is in the center, closed position and the shutoff valve 40 also is in a closed position in which the power-off damping orifice 44 is connected between the two ports 41 and 42 of the hydraulic motor 20. In the state of the steering control system 30, hydraulic fluid from the pump supply line 31 is not applied to the motor, nor is fluid from the motor flowing into the tank return line 32. The intermediate conduits 36 and 38 and the power-on damper 46 now are isolated from the motor 20 by the shutoff valve 40. Any shimmy occurring in the landing gear 12 is dampened by the power-off damping orifice 44. In response to the shimmy force, the motor 20 acts as a pump which drives fluid through the orifice 44 which restricts the fluid flow, thereby dampening the shimmy.

Figure 4:
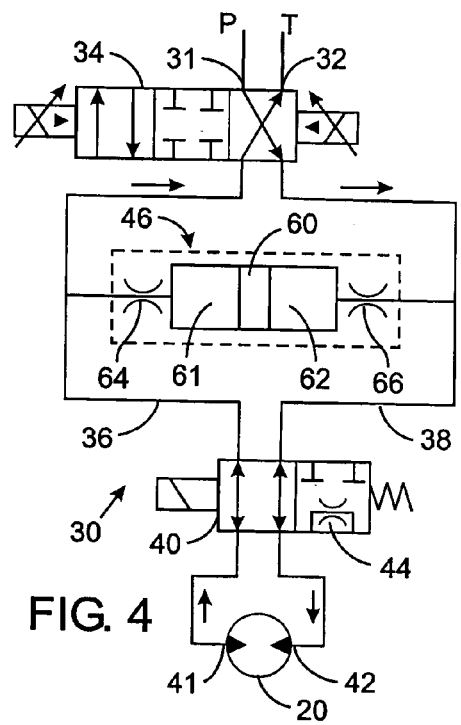
FIG. 4 is a schematic diagram of the hydraulic circuit is a state in which the aircraft is being steered.

In the power-on mode, when the landing gear wheel 24 is being turned, the shutoff valve 40 is electrically driven into the open position illustrated in FIG. 4. In this position the power-on damper 46 is now connected between the ports 41 and 42 of the hydraulic motor 20 and the power-off damping orifice 44 is disconnected. The nose landing gear 12 is steered by placing the flow control valve 34 into one of the two open positions wherein fluid from the pump supply line 31 is directed to one of the two motor ports 41 or 42 via the associated intermediate conduit 36 and 38, while the other motor port is connected to the tank return line 32. When the wheels are not being turned in the power-on mode, the flow control valve 34 is in the center, closed position yet the power-on damper 46 still is connected across the motor ports 41 and 42.

In either turning direction, shimmy that occurs in the landing gear 12 is transmitted as rotational motion through the gear box 18 to the motor 20, thereby affecting the flow of hydraulic fluid through the motor. This produces a pressure differential across the motor and in the two intermediate conduits 36 and 38. That pressure differential is be applied across the power-on damper 46 and via the orifices 64 and 66 into the first and second chambers 61 and 62. The piston 60 responds to this pressure differential by moving toward the chamber having the lower pressure. Thus, fluid flows into the expanding chamber 61 or 62 through the associated orifice 64 or 66 while fluid is forced from the opposite chamber through the other of those orifices, which dampens the shimmy. The shimmy is dampened by the power-on damper 46 regardless of the direction of the pressure differential. Because fluid cannot flow through the power-on damper 46 from one intermediate conduit to the other, there is no power loss with this damping mechanism, as compared to prior mechanisms that had an orifice connected between those conduits. In the normal steering mode, the piston 60 may be bottomed at the end of the first chamber 61 or the second chamber 62 and allow the pressure to build up in motor ports 42 or 41 to turn the motor.

It should be understood that the present power-on damper 46 reacts to relatively high frequency and small amplitude shimmy vibrations, which, in contrast to low frequency and large amplitude command motions, do not result in the piston 60 moving to an extreme end of its travel and remaining there for an appreciable amount of time. Thus, the power-damper would not interfere with the normal steering operation.

By providing separate power-on and power-off dampers, different shimmy dampening characteristics are provided for the power-on and power-off states of the steering control system 30. If different shimmy dampening characteristics are not required the power-on damper 46 is connected across the motor ports 41 and 42 motor at all times.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hydraulic system for steering a landing gear wheel of an aircraft and having a supply line carrying pressurized fluid from a source and a return line that conveys fluid to a reservoir, the hydraulic system comprising:
    a hydraulic motor operatively connected to turn the landing gear wheel and having first and second ports;
    a flow control valve arrangement having a first state in which fluid from the supply line is conveyed to the first port, a second state in which fluid from the supply line is conveyed to the second port, and a third state where the supply line is disconnected from the first port and the second port; and
    a damper having a bore with a piston slidably received therein thereby defining a first chamber and a second chamber in the bore on opposite sides of the piston, the second chamber is coupled to the second port, the damper including a first orifice coupling the first chamber to the first port, wherein the piston moves within the bore uninfluenced by any fastening external to the bore.

2. The hydraulic system as recited in claim 1 wherein the flow control valve arrangement comprises a flow control valve having a first position in which fluid from the supply line is conveyed to the first port and fluid from the second port is conveyed to the return line, a second position in which fluid from the supply line is conveyed to the second port and fluid from the first port is conveyed to the return line, and a third position where the return line and the supply line are both disconnected from the first port and the second port.

3. The hydraulic system as recited in claim 1 wherein the second chamber is coupled to the second port by a second orifice.

4. The hydraulic system as recited in claim 3 wherein the damper comprises a sleeve having the bore therein and having a wall in which the first orifice and the second orifice are formed.

5. The hydraulic system as recited in claim 1 wherein the damper comprises a sleeve having the bore therein and having a wall in which the first orifice is formed.

6. The hydraulic system as recited in claim 1 further comprising a shutoff valve arrangement having one state in which the flow control valve arrangement is connected to the first port and the second port of the motor, and another state in which the flow control valve arrangement is disconnected from the motor and an damping orifice is connected between the first port and the second port.

7. The hydraulic system as recited in claim 1 wherein the piston slides freely within the bore in response to only difference in pressure between the first chamber and the second chamber.

8. The hydraulic system as recited in claim 1 wherein the hydraulic motor is a rotational motor.

9. A hydraulic system for steering a landing gear wheel of an aircraft while taxiing and having a supply line carrying pressurized fluid from a source and a return line that conveys fluid to a reservoir, the hydraulic system comprising:
    a hydraulic motor operatively connected to turn the landing gear wheel and having first and second ports;
    a first intermediate conduit and a second intermediate conduit;
    a flow control valve arrangement having a first state in which the first intermediate conduit is connected to the supply line and the second intermediate conduit is coupled to the return line, a second state in which the first intermediate conduit is connected to the return line and the second intermediate conduit is coupled to the supply line, an third state in which the first intermediate conduit and the second intermediate conduit are disconnected from the supply line and the return line; and
    a damper having a bore with a piston slidably received therein and defining a first chamber and a second chamber in the bore on opposite sides of the piston, the second chamber is coupled to the second intermediate conduit, wherein the piston moves within the bore uninfluenced by any fastening external to the bore, and the damper having a first orifice connected between the first intermediate conduit and the first chamber.

10. The hydraulic system as recited in claim 9 wherein the second chamber is coupled to the second intermediate conduit by a second orifice.

11. The hydraulic system as recited in claim 9 further comprising a shutoff valve arrangement having one state in which the first intermediate conduit is connected to the first port of the motor and the second intermediate conduit is connected to the second port of the motor, and another state in which first intermediate conduit and the second intermediate conduit are disconnected from the first port and the second port and a damping orifice is connected between the first port and the second port.

12. The hydraulic system as recited in claim 9 wherein the piston slides freely within the bore in response to only difference in pressure between the first chamber and the second chamber.

13. The hydraulic system as recited in claim 9 wherein the hydraulic motor is a rotational motor.

14. A hydraulic system for steering a landing gear wheel of an aircraft while taxiing and having a supply line carrying pressurized fluid from a source and a return line that conveys fluid to a reservoir, the hydraulic system comprising:
    a hydraulic motor operatively connected to turn the landing gear wheel and having first and second ports;
    a first intermediate conduit and a second intermediate conduit;
    a flow control valve having a first position in which the first intermediate conduit is connected to the supply line and the second intermediate conduit is coupled to the return line, a second position in which the first intermediate conduit is connected to the return line and the second intermediate conduit is coupled to the supply line, an third position in which the first intermediate conduit and the second intermediate conduit are disconnected from the supply line and the return line;

a shutoff valve having a first state in which the first intermediate conduit is connected to the first port of the motor and the second intermediate conduit is connected to the second port of the motor, and a second state in which first intermediate conduit and the second intermediate conduit are disconnected from the first port and the second port and a damping orifice is connected between the first port and the second port; and a damper having a bore with a piston slidably received therein and defining a first chamber and a second chamber in the bore on opposite sides of the piston, a first orifice connected between the first intermediate conduit and the first chamber, and a second orifice connected between the second intermediate conduit and the second chamber.

15. The hydraulic system as recited in claim 14 wherein the damper comprises a sleeve having the bore therein and having a wall in which the first orifice and the second orifice are formed.

16. The hydraulic system as recited in claim 14 wherein the piston slides freely within the bore in response to only difference in pressure between the first chamber and the second chamber.

17. The hydraulic system as recited in claim 14 wherein the hydraulic motor is a rotational motor.

* * * * *